Jan. 4, 1966  J. H. LEMELSON  3,227,290

ARTICLE HANDLING APPARATUS

Filed Jan. 11, 1963  3 Sheets-Sheet 1

INVENTOR.
JEROME H. LEMELSON

INVENTOR.
JEROME H. LEMELSON

United States Patent Office 3,227,290
Patented Jan. 4, 1966

3,227,290
ARTICLE HANDLING APPARATUS
Jerome H. Lemelson, 85 Rector St., Metuchen, N.J.
Filed Jan. 11, 1963, Ser. No. 250,951
17 Claims. (Cl. 214—1)

This invention relates to an article handling apparatus and is a continuation-in-part of my copending application Serial No. 477,467, entitled Automatic Conveying Apparatus, filed on Dec. 24, 1954, now abandoned.

It is known in the art to provide an article handling apparatus in the form of a manipulator having article seizing means for grasping and retaining an article for assembling said article relative to another article or assembly, positioning said article relative to production apparatus or transferring said article between two locations. Such manipulating apparatus generally consists of a plurality of rigid arms or structural assemblies which pivot or rotate about joint portions of the manipulator assembly. The complexity as well as the cost of producing such manipulator assemblies are relatively substantial, particularly if it is required to position the manipulator seizing means in any location throughout a volume defining the realm of operation thereof. The joints of a conventional manipulator are relatively complex as they require in addition to precision bearings, gear drives or the like for the relative movement of the arm components or assemblies. It is accordingly a primary object of this invention to provide a new and improved manipulator apparatus at least part of which is a substantial simplification over the conventional jointed manipulator apparatus.

Another object is to provide an improved article manipulator or seizing device comprising a positionable flexible means of simple construction.

Another object is to provide an improved article manipulation and transfer device including an article retaining means which is positionable relative to a base without resort to a geared pivotal mount therefor.

Another object is to provide an improved article seizing means consisting of an easily positionable flexible arm which is substantially void of complex mechanisms.

Another object is to provide an improved suction device for handling conventional or odd shaped articles of manufacture.

Another object is to provide means whereby a flexible tubular element may be easily prepositioned at a plurality of locations throughout a given spacial volume for performing different manufacturing functions.

Another object is to provide an improved article seizing and manipulation apparatus including a wheeled vehicle for easily positioning said apparatus at different locations.

The invention also consists of certain and original features of construction and a combination of parts hereinafter set forth as claimed.

The nature of the invention, as to its objects and advantages, the mode of its operation and the manner of its organization, may be better understood by referring to the following description taken in connection with the accompanying drawings forming a part thereof in which.

Figure 1:
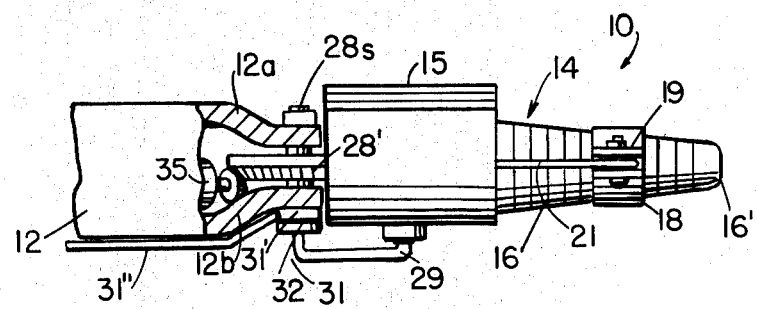
FIG. 1 is a plan view of part of an article manipulation apparatus including a flexible arm.
Figure 2:
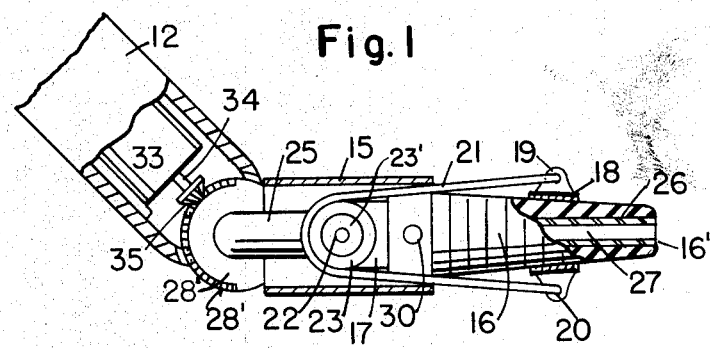
FIG. 2 is a side view of the apparatus of FIG. 1 with parts sectioned and broken away for clarity.

There is shown in FIGS. 1 and 2 part of an automatic manipulator 10 for transferring various articles of manufacture between two locations or selectively prepositioning an article and retaining or manipulating said article in an assembly operation. Rotationally mounted on an arm or base 12 is a manipulator assembly 14 which includes a flexible member or arm 16 which is capable of retaining an article at the end thereof and of being deflected to preposition said article in a variety of different attitudes. The flexible arm 16 is secured to a base 17 which is rigidly affixed to a further base or housing 15 having a circumscribing side wall and open at the end through which the flexible arm 16 protrudes. Mounted within the housing 15 is a reversible motor 23' which is operatively connected to rotate a shaft 22 which is supported in bearing within the housing 15 and supports a pulley 23 around which a flexible belt or chain 21 extends as illustrated. Flexible member 21 may comprise a so-called V-drive belt of the type used between pulleys in conventional drives and is connected at its ends to respective lugs 19 and 20 which project diametrically across from each other outward from a metal collar 18 which is secured to the side wall of the flexible arm 16 near the free end thereof. The motor driving pulley 23 is preferably a reversible motor and is operatively connected to means for effecting its precise rotation in either direction from a zero or neutral position so that it may provide, by means of said pulley, tension on one of the legs of the member 21 while slackening the tension on the other leg to deflect the flexible member 16 in the tensioned direction. If member 21 is a drive chain or a toothed belt having its toothed formations operatively engaged with teeth of the pulley 23 or is otherwise provided so that there will be substantially no slippage between the pulley and the belt, flexible arm member 16 may be deflected a predetermined degree in either direction by controlling the operation of the motor and the degree of rotation of the pulley driven thereby. Motor 23' may also comprise a stepping motor.

In the manipulator assembly illustrated in FIGS. 1 and 2, suction means is utilized for retaining an article against the end 16' of the flexible arm member 16 by extending an opening 27 through said arm member and applying a vacuum thereto upon closure of the opening at the free end of 16 by engaging it against the surface of the workpiece to be handled or manipulated thereby.

The flexible arm member 16 may be made of a suitable rubber or plastic material or of metal provided as a plurality of assembled segments or integrally connected convolutions in a sheet metal tubing in a manner whereby it may be easily deflected yet will support work at the end thereof with little or no deflection. A maximum weight for an article or object to be handled by the apparatus of FIGS. 1 and 2 will, of course, necessarily be specified beyond which some deflection may occur in the flexible arm 16 depending upon the attitude of the assembly and how it is accelerated during its operation. Secured to and protruding outward from the rear end of the housing 15 is a circular bevel gear 28 which serves as means for effecting the rotation of the assembly 14 relative to the base or arm 12 by engagement of the teeth 28' with a smaller gear 35 which is secured to the shaft 34 of a gear-motor 33 shown mounted within 12. Lugs 12a and 12b extending from the end of arm 12 retain respective aligned bearings (not shown) which support a shaft 28S for permitting the rotation of assembly 14 on the end of 12. While suction pressure or vacuum may be applied to the passageway 27 extending through arm 16 by means of a flexible line having sufficient slack to account for the maximum degree of movement of member 16, a rotary coupling means is shown in FIG. 1 for connecting a source of vacuum to the passageway 27 without resort to flexible lines connected thereto. A first U-shaped section 29 of rigid tubing is shown secured to housing 15 and extending through an opening in the wall thereof to the inside of said housing where it is coupled to an opening 30 in the base of the flexible arm 16 to the interior passageway 27 of said arm. The other end of 29 extends to a first fitting 32 of a rotary coupling 31 the axis of which is the axis of rotation of assembly 14 which is substantially the axis of the shaft or pin 28S. The other portion 31' of the coupling 31 is fixedly mounted on the lug 12b and is coupled to a fluid line 31" which is shown secured to the exterior of arm 12. Thus vacuum pressure applied to 31" will be applied through the rotary coupling 31 and line 29 to the interior passageway 27 of flexible arm 16 regardless of the degree of rotation of 14 relative to 12 or deflection of 16.

Further details of the apparatus of FIGS. 1 and 2 include a liner 26 extending through the opening in flexible arm 16 which may be made of flexible tubing particularly if arm 16 comprises as the major portion thereof, a plurality of joined metal segments. Various fittings such as suction cups, fingers, magnets or other article retaining devices may also be secured to the end of arm 16 as illustrated hereafter. It is also noted that the arm or base member 12 may have any suitable configuration and may itself be movable and automatically positionable relative to a further support or base by means of a further servo or servos which are preferably automatically controllable by a programming means which may vary from a relatively complex numerically controlled computer device to a simpler programming means such as a multi-circuit timer or the like adapted to control the operation of the various servos to cause the end of the flexible arm 16 to travel a predetermined path in prepositioning and transferring a work member held thereby.

The servo driven flexible member or belt 21 and the drive therefor may be replaced by a plurality of lineal actuators such as fluid operated motor or cylinders which are secured to the base 15 and are operative to cooperatively move the flexible member or arm in bending with the work holding means at the end thereof traveling a predetermined path. Such servos may be automatically controlled in sequence with the predetermined operation of the other servos operative to move the apparatus of FIGS. 1 and 2 in a predetermined work transfer cycle.

Figure 3:
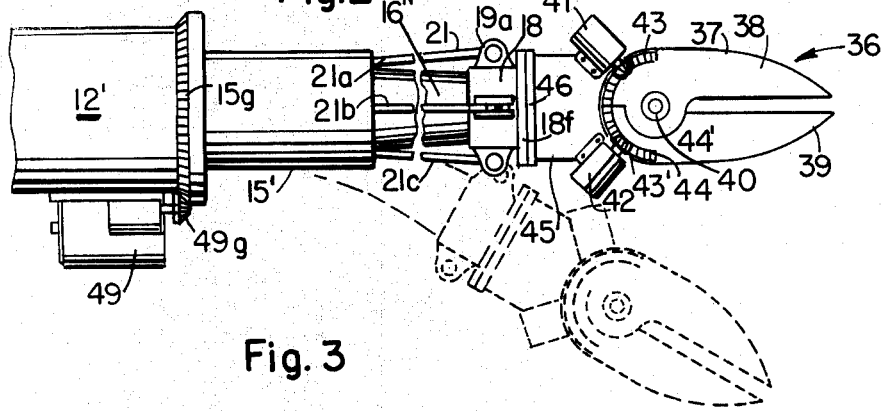
FIG. 3 is a side view of a modified form of the apparatus illustrated in FIGS. 1 and 2.

In FIG. 3 a work retaining and manipulating apparatus is illustrated which utilizes a deflectable arm device of the type provided in FIGS. 1 and 2, to preposition a work clamping or seizing means in the form of closable and openable jaw members 38 and 39 forming part of an assembly 37 which is secured to the end of a flexible arm 16" of the type provided in FIGS. 1 and 2. The jaws 38 and 39 are operated to open and close relative to each other by means of respective servos 41 and 42 which are mounted on a base 45 having a flange 46 which is connected to the flange 47 of a tubular coupling 48 which circumscribes and is secured to the end of 16". The servos 41 and 42 are either hydraulic or electrical gear-motors having gears 43' and 44' secured to their output shafts which mesh with gear formations 43 and 44 provided on the face of each jaw member disposed radial to the axis of the shaft 40 around which the jaw members rotate.

Deflection of the flexible arm 16" is effected as in FIGS. 1 and 2 by tensioning one of two portions of the flexible drive means 21 by means of a servo motor mounted within a housing or arm 15'. Such an arrangement may be modified for any of the described embodiments whereby the flexible drive belt is replaced by a plurality of arms actuated by one or more lineal servos mounted within the housing 15' and preferably automatically controlled in both sequence and degree of movement by the same computer or automatic controller which controls further servo means for moving and prepositioning the housing 15'. Said further servo means is illustrated in FIG. 3 as an electrical gear-motor which is secured to a base 12' which also supports the base 15' for rotation about its longitudinal axis. A first gear 49g secured to the output shaft of drive 49 operatively engages a larger gear 15g which is a circular spur gear secured to the end of arm 15' having its axis the longitudinal axis of arm 15'. Thus by automatically controlling the degree of rotation of drive motor 49 and the operation of either the drive motor or actuators mounted within housing 15' for deflecting arm 16', the clamp or jaw assembly 37 may be caused to move through a predetermined path. If the operation of the servos 41 and 42 which control the opening and closing of the jaws 38 and 39 is similarly controlled as to sequence and degree of rotation of each by the same cycle controller or computer which controls the other servos which are operative to preposition the clamping assembly, then said clamping assembly may be prepositioned and operated to pick up and perform a plurality of prepositioning and transfer operations involving work members of different configurations. In other words the device illustrated in part in FIG. 3 may be presented as a highly versatile manipulative tool which is relatively simple in structure.

Also illustrated in FIG. 3 are additional actuators referred to by the notations 21a, 21b and 21c for positionally controlling the jaw assembly 37 in more than two directions by the controlled tensioning of at least two of said actuators. It is easily seen that if four actuating arms or portions of flexible belts are so provided and are mounted 90° apart around the arm 16", by controlling the operation of any two adjacent actuators to retract or tensionally draw each actuator a predetermined degree, then the end of the flexible arm may be moved through any predetermined path relative to the arm 15' and prepositioned at a predetermined location in the realm attainable thereby in front of arm 15'. In such an arrangement, each servo or actuator is preferably connected to means for controlling the actuator which is connected to an automatic sequential controller or computer programmed to effect predetermined degrees of motion of said actuators in a sequence to effect movement of the flexible arm along a predetermined path.

Figure 4:
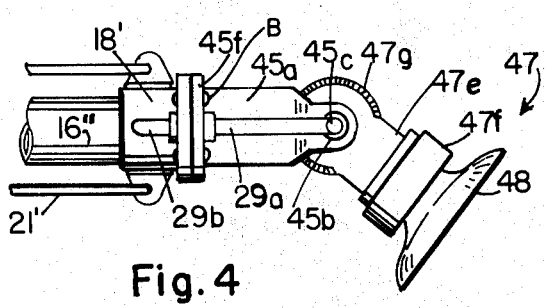
FIG. 4 is a side view of an apparatus of the type illustrated in FIG. 3 but modified as to the end fixture thereof.

FIG. 4 illustrates a suction type of article seizing means applicable to the apparatus of FIG. 3. The flanged fitting 46 provided at the end of the flexible arm 46" is shown secured to a flange 45f by means of fasteners such as bolts B. The flange 45f terminates an arm 45a having a yoke 45c at the end thereof between which it is rotationally supported a gear plate 47g which terminates an assembly 47 including a suction cup 48. Suction is applied across the joint by means of a rotary coupling 45b joining a hose or tube 29a extending along the wall of 45a and connected to a second hose 29b by means of a coupling provided at the flange. The hose 29b extends to the hollow interior of the flexible arm 16" through which suction is applied and the portion of the rotary coupling 45b not illustrated extends through an opening in the gear plate 47g which extends through the base of the suction cup 48 and communicates with the volume interior of the suction cup. Notation 47f refers to a removable band or clamp for retaining the end of the suction cup assembly assembled with the cylindrical, hollow tubular projection 47a forming part of the assembly 47. The structure illustrated in FIGS. 3 and 4 permits rapid change of article seizing means such as those illustrated and it is noted that any fluid or electrically powered article seizing means may be employed on a single flexible manipulator arm to perform different article transfer or assembly functions utilizing a single apparatus. Electrical coupling between the article seizing means and the means situated along or beyond the flexible arm may be effected by means of a simple male-female electrical connector and sufficient slack line between the electrical motor operating the article seizing means and the electrical cable or conductor extending along the interior or exterior of the next manipulator member. Each cable may be fastened to the exterior or the interior of the respective assembly in a limp condition so that movement of one assembly relative to the other will not cause the coupling of the lines. Rotary electrical joints are also shown in my said co-pending application Serial Number 477,467, now abandoned which are applicable to the apparatus provided in this application and which employ conducting strips along a surface at one joint member and spring loaded brushes adapted to contact said conducting strips upon assembly of the two joint members.

Figures 5, 6:
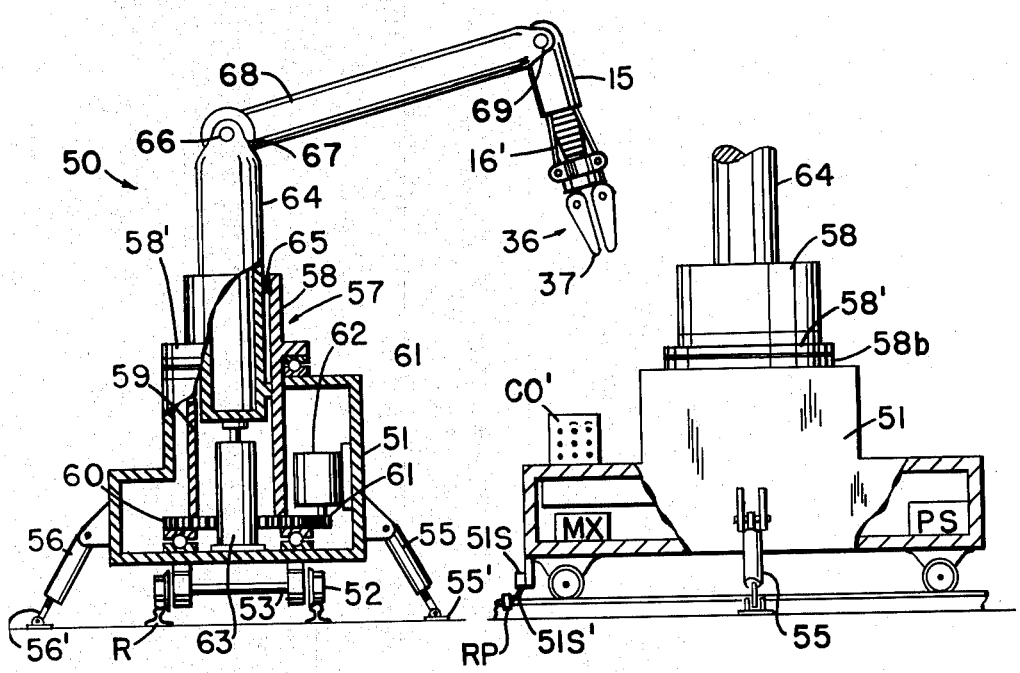
FIG. 5 is an end view with parts broken away for clarity of an article manipulation apparatus having features of the apparatus illustrated in FIGS. 1–4.
FIG. 6 is a side view of the apparatus of FIG. 5 with parts broken away for clarity.

FIGS. 5 and 6 illustrate an article transfer or manipulation apparatus 50 employing a flexible arm mounted jaw assembly 36 of the type hereinabove described for seizing and retaining or transferring an article which is conveyed or otherwise prepositioned relative to said apparatus. The apparatus 50 is also provided with wheels and drive means for moving it in a predetermined path along a trackway illustrated as comprising two rails R so that the jaw assembly 36 may be moved into alignment with selected ones of a plurality of articles or assemblies positioned adjacent said trackway.

The apparatus 50 comprises an elongated body or carriage 51 having plate metal walls which is shown having wheels 52 depending downward therefrom and rotationally mounted thereon. A motor Mx is secured within body 51 and operatively connected by gears (not shown) to drive the vehicle 50 along floor mounted tracking R. The flexible manipulator head assembly 36 is shown secured to a first arm 15 which is rotationally mounted as described to pivot on the end of a second arm 68 which in turn, is rotatably supported on a third arm or column 64 which itself is rotationally supported on the vehicle and is driven about a vertical axis by means of a motor 62 also fixedly mounted with the housing or body 51. The joints 66 and 69 which respectively connect arm assemblies 64, 68 and 15 are preferably made in accordance with the structural features illustrated in FIGS. 1 to 3 and are each provided with a respective servo motor for moving each assembly relative to the other. A further servo 63 comprises a lineal actuator such as a hydraulic or air cylinder which is mounted within 51 and is shown operatively connected to the vertical arm or column 64 for raising and lowering said column to increase the versatility of the manipulating apparatus, although, like certain of the other components, need not be provided depending on the type of manipulative movements required of the apparatus.

The column 64 is cylindrically shaped and is slidably retained within a rotatable assembly 57 including a large circular gear 60 secured to the end of a cylinder 58 which column 64 rotates with but is axially movable therein on the end of the ram of lineal actuator 63.

Longitudinal slots (not shown) in the inside surface of the side-wall of cylinder 58 define longitudinal guide means for pins extending radially outward from 64 to permit the longitudinal displacement of 64 within 58 yet define means for preventing the rotational displacement of 64 relative to 58 so that when the latter is rotated as the gear 60 is driven by the gear 61 of gear-motor 62, 64 and the upper assembly secured thereto will also rotate. The assembly 57 is rotationally supported on the upper wall 51a of the housing 51 by means of a circular flange member 58' welded to the outer surface of 58 which rides on a tapered roller bearing 58b supported by the upper surface of 51a.

Further features of the manipulator apparatus 50 include means for stabilizing and supporting the vehicle in the form of hydraulic cylinders 55 and 56 which are secured to the side-walls or frame of the vehicle body 51 and are operative to project respective ram plates 55' and 56' against the floor or ground adjacent the apparatus. Said stabilizing servos may be manually or automatically operated when, for example, the apparatus is at a predetermined position along the trackway such that the apparatus is referenced or prepositioned relative to articles or an assembly which are prepositioned relative to the trackway. Electrical indication of predetermined locations or stations along the trackway may be derived by scanning locating devices situated along or adjacent the rails R and, accordingly, a limit switch 51S is provided on an arm 51S' projecting downward from 51 and has an actuator arm which is positioned to be deflected as it passes locating pins RP which are prepositioned along the track and extend laterally outward therefrom.

Control of all of the described servos in a predetermined sequence and cycle to effect prepositioning of the apparatus and movement of the article seizing head in a predetermined path to pick up, preposition and/or transfer a predetermined article, is effected by means of a controller or positional computer CO shown mounted within the body 51. The controller CO is preferably programmed or preset to define a predetermined positional command cycle of those servos to be controlled thereby, from a console CO' shown mounted on the housing 51 in a position whereby it is easily accessible to an operator. The description of said control apparatus CO for controlling operation of the various described servos is presented in greater detail hereafter and illustrated in FIG. 8. It may vary from a simple, adjustable multi-circuit open loop controller such as a multi-circuit timer to a multi-channel analog or numerical control computer of the types described in my application Serial Number 477,467 or as described in Patents 2,475,245 and 3,002,615. Suffice it to say that the computer has control outputs operatively connected to the controls for each of the described servos for effecting sequential operation of the jaws 37, predetermined and sequential deflection of the arm 16 and sequential and predetermined movement of the various assemblies to move the seizing head 36 through a predetermined path with an article retained thereby. The apparatus 50 is shown having its own power supply PS mounted therein and connectable for operating the positional controller and the servos controlled thereby.

It is noted that certain variations in the apparatus 50 may be effected in accordance with particular transfer, prepositioning, assembly or work functions to be performed by the head assembly 36. For example, the head 36 may be mounted directly on arm 68 or on column 64. A plurality of such heads may be mounted on a turret supported by any of the arms illustrated for performing multiple functions, as illustrated in some detail in my said copending application Serial Number 477,467. If the coupling means 46 of FIG. 3 is provided at the end of arm 16' various holding devices or production tools may be secured thereto to perform different production, maintenance or transfer operations.

The flexible arm 16 may be provided with an article seizing means such as the illustrated jaws or clamps, suction means as hereinabove described or other means. It may also be replaced by other simpler or more complex flexible or rigid article handling means or by one or more motor operated tools or the like for the performance of various operations on work it is prepositioned relative to.

Figure 7:
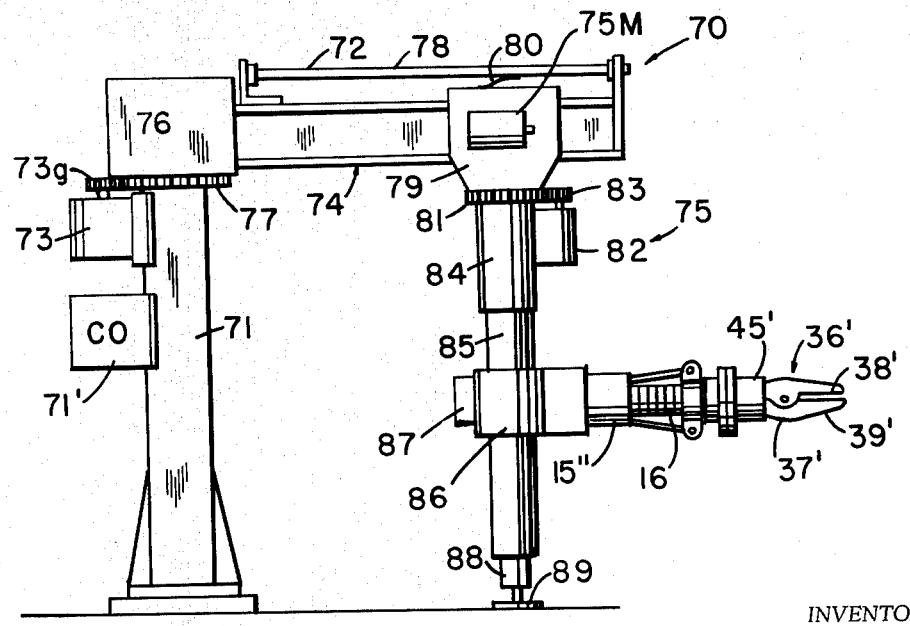
FIG. 7 is a side view of an article manipulation apparatus having components with the features illustrated in FIGS. 1–4 and including an overhead mounted carriage which is movable along a jib-boom or crane.

FIG. 7 illustrates a floor mounted apparatus 70 employing a flexible arm assembly 36' of the type described for performing various transfer or production operations relative to work-in-process. The apparatus includes a first stationery vertical column 71 preferably secured to or fixedly maintained against the floor and having an assembly 72 secured to the upper end of 71 and including an overhead track 74 extending horizontally outward from 71. The overhead track 74 forming part of the overhead assembly is secured to a mount 76 which is shown rotationally mounted at the upper end of 71 and rotatable by means of a circular gear 77 secured thereto which is engaged by a smaller circular spur or bevel gear 73 which is part of the gear frame associated with a gear-motor 73 secured to 71.

A manipulator assembly 75 is supported on an overhead carriage 79 which is movable along track 74 and power operated by means of an electric motor 75M secured to the carriage. Depending downward from 79 and rotationally supported thereon is a first column member 84 having a gear motor 82 secured thereto, the drive gear 83 of which engages a large circular spur or bevel gear 81 secured to 79 so that as reversible motor 82 operates, it will cause rotation of 84. Supported by and extending vertically downward from 84 is a cylindrical track 85 which supports a fixture 86 containing the flexible arm manipulator assembly. Fixture 86 and the flexible arm assembly are movable vertically up and down column or track 85 by means of a reversible drive motor 87 secured to 86. A lineal actuator 88 is secured to the lower end of 85 and is operative to project a ram or plate against the floor to support the assembly 75 from the load.

The flexible manipulator arm assembly 36′ includes a flexible arm unit 16 secured to a base 15″ which is removably secured to fixture base 86. Retained against the other end of 16 is a jaw assembly 37′ of the type illustrated in FIG. 3 but having a modified base 45′ containing a single servo such as a lineal actuator for opening and closing the individual jaws 38′ and 39′ in response to an input signal or signals to the control or said actuator. Details of such a lineal actuator operated jaw assembly are shown in my said copending application Serial No. 477,467. A presettable programming device or positional computer CO is provided in a housing 71′ shown secured to the vertical column 71 and preferably contains a plurality of output circuits connected to each of the described servos for sequentially controlling their operation to preposition the assembly 72 at a predetermined angular attitude relative to 71, the carriage 79 at a predetermined location along overhead track 74, the assembly 75 in a predetermined attitude relative to 79, the fixture base 86 at a predetermined location along the vertical column 85 and the flexible deflectable arm 16 in a predetermined deflected attitude and to move thereafter through a predetermined arc to predetermine the path of movement of the jaw assembly 37′ and the movement of an article retained thereby. Electrical coupling is attained between the outputs of CO and the assembly 72 by means of conventional brush contacting means having components secured to the upper end of 71 and to 76 in sliding engagement with each other, by means of a plurality of slide wires 78 insulatedly supported above 74 which are engaged by a plurality of respective brushes shown at 80 which are insulatedly supported on and project upward from the carriage 79 and by further brush-slide contact means electrically coupling 84 to 79, 86 to 85 and assembly 36′ to 15″. The laterally extending arm 35′ which pivots about 23b, is provided with a flange 35f at the end thereof and the assembly 70 may be fixedly mounted on or rotationally mounted relative to 35′ and power operated by the reversible motor secured within 35′ but not shown. Details of such a structure will be hereinafter described. The jaws 71 and 72 are automatically opened and closed to seize and preposition a workpiece therebetween by means of one or more lineal actuators secured within the base 76 which directly supports said jaws and shown in part by the actuating elements 73 and 75 which engage the rear portion of each of said jaw members. It is noted that each of the hereinabove described servos including the locking servos 25 and 29 are preferably automatically controlled by the positional control or computing mechanism situated within the housing CO by wires or other conductors extending to each of the movable components with coupling preferably being made by means of brushes sliding across stationary contacts or sliperings at each of the joints as will hereinafter be more fully described.

Figure 8:
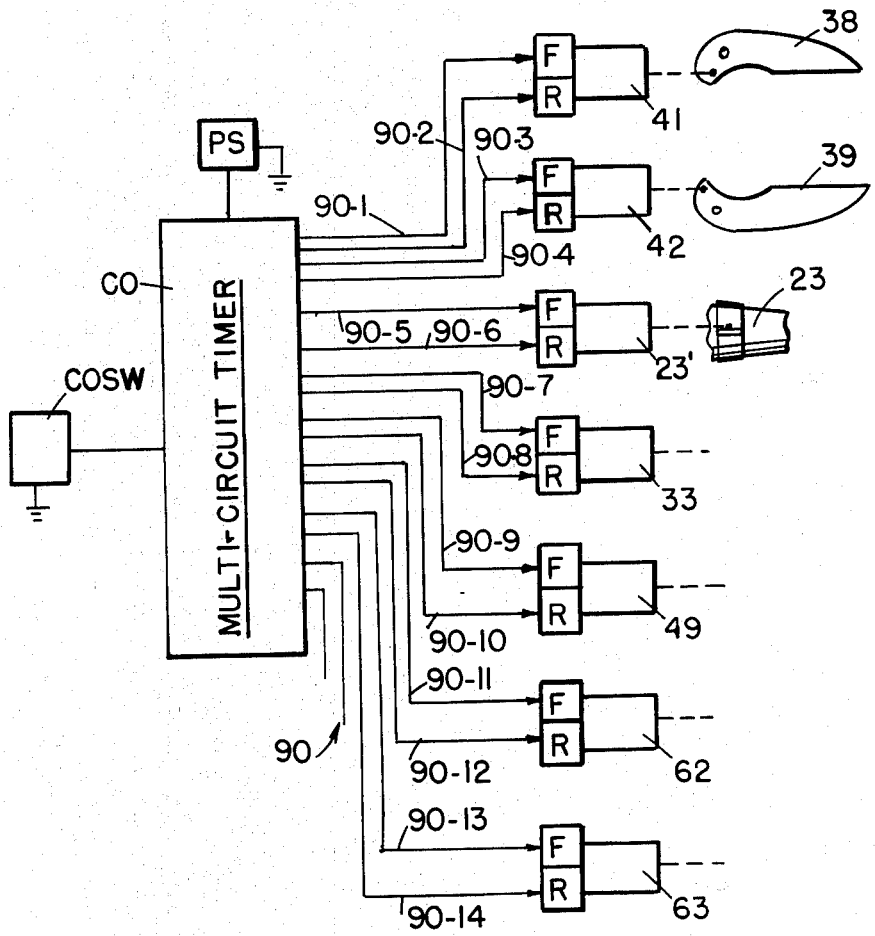
FIG. 8 is a diagrammatic showing of one form of automatic control for the manipulator.

FIG. 8 illustrates one form of an automatic control means for manipulator apparatus of the type described, which control means is operative to control the various servos in a predetermined sequence of motions or cycle for effecting a particular article transfer operation.

An automatic control device CO is provided having control circuits extending therefrom to the control inputs of the various servos described for controlling the operation of each in a predetermined sequence and manner to cause the article seizing means to be prepositioned with respect to an article, clamp on or retain same by suction and moved thereafter in a predetermined path to further transfer and position the article in a production operation. As stated, device CO may comprise an adjustable multi-circuit timer having a starting switch CO–SW activated by any suitable means to start the cycle. Outputs 90–1 and 90–2 are shown extending respectively to the forward and reverse control inputs F and R of servo 41 for moving jaw 37 in response to energization of said control lines in sequence and for predetermined time intervals as effected by the cycle controller CO. Similarly electrical outputs 90–3 to 14 are connected to the forward and reverse control inputs of the servos 42, 23, 33, 49, 62 and 63 for controlling the movement of the various devices and assemblies hereinabove described.

If the suction means of FIGS. 1 and 2 are utilized to seize and release articles, an output of device CO may extend to means controlling the application of suction thereto.

It is to be understood that the above-described arrangements are illustrative of the application of the principles of the invention. Numerous other arrangements may be devised by those skilled in the art without departing from the spirit and scope of the invention.

I claim:

1. Article manipulation and transfer apparatus comprising in combination with an elongated arm including an elongated flexible member which is flexible substantially throughout its length capable of flexure by bending through a predetermined arc without exceeding the elastic limit thereof, one end of said flexible member being free to move, article seizing means, said article seizing means being supported by said flexible member near said one end thereof, a rigid base member, said flexible arm member being supported near its other end by said base member, power means including an actuator means operatively coupled to said power means and movable upon the operation of said power means, said actuator means supported by said base member and being operatively connected to said flexible arm member in a manner whereby when said power means operates said actuator means it will predeterminately flex said arm member whereby said flexible arm member predeterminately positions said article seizing means.

2. Apparatus in accordance with claim 1 in which said arm member comprises an assembly of components, at least one of which is tubular in shape and is flexible.

3. Apparatus in accordance with claim 1 in which said power means is reversible.

4. Apparatus in accordance with claim 3 including an automatic control means operatively connected to said power means to control the operation thereof in a cycle which includes movement of said flexible arm member through a predetermined arc from a first position and return to said first position.

5. Apparatus in accordance with claim 4, including control means for controlling operation of said article seizing means and said power means, said automatic control means including a variable programming means, said variable programming means being operatively connected to said control means for operating both in a sequence including movement of said flexible arm to a position opposite an article to be seized, operation of said seizing means to seize said article, movement of said flexible arm with the article retained to a further position, and operation of said seizing means thereafter to release said article.

6. Apparatus in accordance with claim 5, said seizing means being air suction operated to retain said article by air pressure adjacent the end of said arm.

7. Apparatus in accordance with claim 5, said seizing means comprising a clamping fixture disposed at the free end of said elongated flexible member, said clamping means comprising a plurality of jaws, means for opening and closing said jaws, power means for operating said jaw opening and closing means, control means for said power means, said control means being operatively connected to said programming means for opening and closing said jaws in sequence with the movement of said arm to seize and release an article.

8. Apparatus in accordance with claim 1, said power means being operatively connected to elongated actuator means disposed adjacent to said flexible member, said power means adapted to tensionally retract one said actuator means at one side of said flexible member while releasing tension on said actuator means on the other side thereof upon operation of said power means to bend said flexible member and move said arm through a predetermined arc.

9. Apparatus in accordance with claim 8 including fitting means disposed near the free end of said flexible member and means for securing said actuator means to said fitting means for operative connection therewith.

10. Apparatus in accordance with claim 9, including a second base member, means for rotationally supporting said first base member on said second base member, and further power means for prepositioning said second base member in rotation on said first base member.

11. Apparatus in accordance with claim 10 including further means for moving and prepositioning said second base member relative to articles to be handled by said manipulator.

12. A transfer apparatus comprising in combination with an elongated member which is flexible substantially throughout its length, a first base member secured to one end of said elongated member with the other end of said member free to move, article seizing means located near the free end of said elongated member, a first reversible power means secured to said base member, a fitting secured near the free end of said elongated member, a plurality of force transfer means disposed between said power means and said fitting for flexing said flexible member in a manner depending on the direction and degree of operation of said power means, a second base member pivotally secured to said first base member, second power means secured to said second base member and operatively connected for rotating said first base member on said second base member, and means for controlling and simultaneously operating each of said power means to cause flexure of said elongated flexible member through a predetermined arc and the movement of free end thereof through a predetermined spatial path.

13. A transfer apparatus in accordance with claim 12, said elongated member having a longitudinal passageway therethrough, conduit means extending from said second base, said first base and to the passageway on said elongated member, means for applying and releasing suction pressure on said conduit, an opening at the end of said passageway in said elongated member shaped for retaining an article against said end when suction is applied to said conduit, means for said suction pressure means, and a sequential controller operatively connected to said controls for predetermining the path of movement of said first base member relative to said second base member, the degree of flexure of said elongated member and the timing and duration of application of suction to said conduit to effect the pick-up and transfer of said article through a predetermined path.

14. Article manipulation and transfer apparatus including article-gripping means and a support arm assembly supporting said article-gripping means, at least a portion of said support arm assembly comprising an elongated arm flexible substantially throughout its length supporting said article gripping means and bendable so that said article-gripping means may be moved thereby through an arc thereby for permitting manipulation of articles held thereby, first power operative means for deflecting said flexible supporting arm, said support arm assembly also being rotatable about a substantially vertical axis.

15. The apparatus defined in claim 14 including a base, said support arm assembly includes said vertical portion which is rotatably mounted on a base, and second power operative means for rotating arm assembly on said base.

16. Article manipulation and transfer apparatus comprising a manipulator arm, a gripping member at one end of said arm, said arm including elongated member flexible substantially throughout its length supporting said gripping member, said flexible member being capable of flexure by bending through a predetermined arc without exceeding the elastic limit thereof, said arm being secured near its other end to a base member, power means including an output means movable upon the operation of said power means, said output of said power means being operatively connectable to said elongated member in a manner whereby when said power means is operative and connected to said arm member, it will flex said arm member.

17. Apparatus in accordance with claim 16, including a wheeled support for said base, said basing being movably mounted on said wheeled support for rotation about a substantially vertical axis, power means for rotating said base on said support controls for each of said power means a controller mounted on said wheeled support and connected to said controls for said power means and operative for controlling said power means to control movement of said base relative to said support and the flexure of said flexible arm to move said gripping member in a predetermined path through the spatial volume surrounding said apparatus, and further power means for operating said gripping member to seize and release an article, said further power means being controllable by said controller to seize and release an article at predetermined points in a movement cycle controlled by said controller.

References Cited by the Examiner

UNITED STATES PATENTS

| | | |
|---|---|---|
| 1,140,839 | 5/1915 | Moore. |
| 2,475,245 | 7/1949 | Leaver et al. _____ 318—162 |
| 2,595,134 | 4/1952 | Gordon. |
| 2,861,700 | 11/1958 | James. |

GERALD M. FORLENZA, *Primary Examiner.*

HUGO O. SCHULZ, *Examiner.*

R. G. SHERIDAN, *Assistant Examiner.*